United States Patent
Weaver et al.

(10) Patent No.: US 9,834,715 B2
(45) Date of Patent: Dec. 5, 2017

(54) DUAL-PURPOSE VISCOSIFIER AND SURFACE ACTIVE ADDITIVES AND METHODS OF USE

(71) Applicant: Halliburton Energy Services, Inc., Houston, TX (US)

(72) Inventors: Jim Weaver, Duncan, OK (US); Michael McCabe, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/022,816

(22) PCT Filed: Oct. 17, 2013

(86) PCT No.: PCT/US2013/065442
§ 371 (c)(1),
(2) Date: Mar. 17, 2016

(87) PCT Pub. No.: WO2015/057230
PCT Pub. Date: Apr. 23, 2015

(65) Prior Publication Data
US 2016/0230065 A1 Aug. 11, 2016

(51) Int. Cl.
| | |
|---|---|
| *E21B 43/22* | (2006.01) |
| *C09K 8/035* | (2006.01) |
| *C09K 8/40* | (2006.01) |
| *C09K 8/42* | (2006.01) |
| *C09K 8/52* | (2006.01) |
| *C09K 8/64* | (2006.01) |
| *C09K 8/68* | (2006.01) |
| *C09K 8/72* | (2006.01) |
| *C09K 8/82* | (2006.01) |
| *C09K 8/88* | (2006.01) |
| *C09K 8/90* | (2006.01) |
| *E21B 43/04* | (2006.01) |
| *C09K 8/44* | (2006.01) |
| *C09K 8/62* | (2006.01) |
| *C09K 8/74* | (2006.01) |
| *E21B 43/16* | (2006.01) |

(52) U.S. Cl.
CPC .............. *C09K 8/035* (2013.01); *C09K 8/40* (2013.01); *C09K 8/42* (2013.01); *C09K 8/44* (2013.01); *C09K 8/52* (2013.01); *C09K 8/62* (2013.01); *C09K 8/64* (2013.01); *C09K 8/68* (2013.01); *C09K 8/685* (2013.01); *C09K 8/725* (2013.01); *C09K 8/74* (2013.01); *C09K 8/82* (2013.01); *C09K 8/887* (2013.01); *C09K 8/90* (2013.01); *E21B 43/04* (2013.01); *E21B 43/16* (2013.01); *C09K 2208/24* (2013.01); *C09K 2208/26* (2013.01)

(58) Field of Classification Search
CPC .......... C09K 8/68; C09K 8/685; C09K 8/805; C09K 8/80; C09K 8/62; C09K 8/512; E21B 43/267; E21B 43/26; E21B 33/138; E21B 43/04; E21B 43/025; E21B 43/16; E21B 33/134; E21B 43/25
See application file for complete search history.

(56) References Cited

U.S. PATENT DOCUMENTS

| | | | |
|---|---|---|---|
| 5,720,347 A | 2/1998 | Audibert et al. | |
| 2002/0161087 A1* | 10/2002 | Heitz | C08F 293/00 524/379 |
| 2006/0254774 A1* | 11/2006 | Saini | B01F 17/0028 166/300 |
| 2009/0075845 A1* | 3/2009 | Abad | C09K 8/12 507/117 |
| 2009/0203555 A1 | 8/2009 | Milne et al. | |
| 2010/0311621 A1 | 12/2010 | Kesavan et al. | |
| 2011/0030961 A1 | 2/2011 | Maxey | |
| 2012/0186877 A1 | 7/2012 | Ezell | |

OTHER PUBLICATIONS

International Search Report and Written Opinion issued in related PCT Application No. PCT/US2013/065442 dated Jul. 24, 2014, 11 pages.
Rojas, Orlando J., et al. "Interfacial properties of sugar-based surfactants." Bio-Based Surfactants and Detergents: Synthesis, Properties and Applications, AOCS Press, Urbana (2009), pp. 457-480.
Piispanen, Peter S., et al. "Surface properties of surfactants derived from natural products. Part 1: syntheses and structure/property relationships—solubility and emulsification." Journal of surfactants and detergents 7.2 (2004), pp. 147-159.
Piispanen, Peter S., et al. "Surface properties of surfactants derived from natural products. Part 2: structure/property relationships—foaming, dispersion, and wetting." Journal of surfactants and detergents 7.2 (2004), pp. 161-167.

* cited by examiner

*Primary Examiner* — Zakiya W Bates
(74) *Attorney, Agent, or Firm* — Craig W. Roddy; Baker Botts L.L.P.

(57) ABSTRACT

Dual-purpose additives that may be used as viscosifying agents and surface active agents in fluids, subterranean treatments and oilfield operations are provided. In one embodiment, the methods comprise: providing a treatment fluid comprising a base fluid and a polymeric dual-purpose additive comprising a base polymer comprising a plurality of monomer units, and one or more hydrophobic groups bonded to at least one of the monomer units; introducing the treatment fluid into at least a portion of a subterranean formation; and depolymerizing at least a portion of the dual-purpose additive to form one or more surface active fragments, each of the surface active fragments comprising one or more of the hydrophobic groups bonded to one or more of the monomer units.

20 Claims, 4 Drawing Sheets

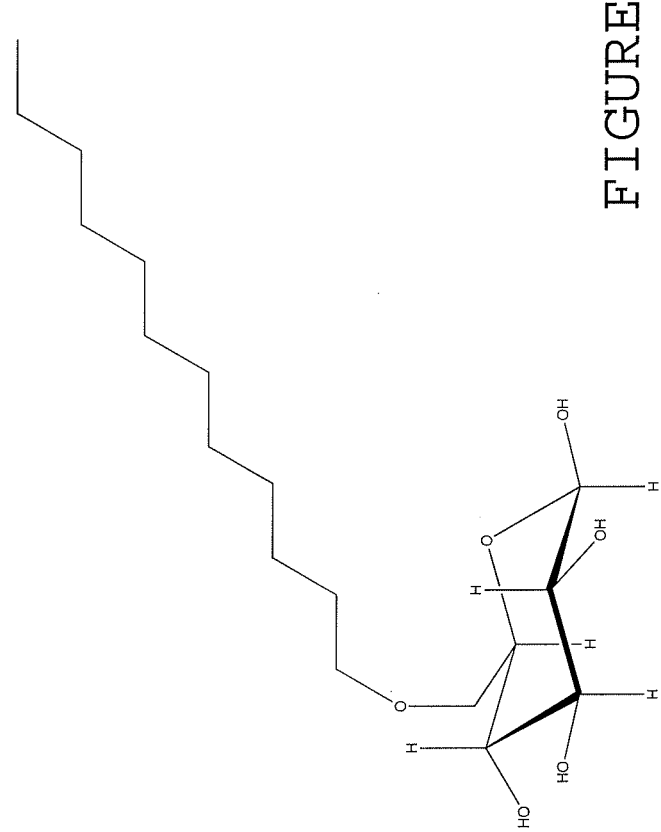

DUAL-PURPOSE VISCOSIFIER AND SURFACE ACTIVE ADDITIVES AND METHODS OF USE

CROSS-REFERENCE TO RELATED APPLICATION

The present application is a U.S. National Stage Application of International Application No. PCT/US2013/065442 filed Oct. 17, 2013, which is incorporated herein by reference in its entirety for all purposes.

BACKGROUND

The present disclosure relates to fluids, additives, and methods for use in subterranean treatments, and more specifically, to dual-purpose additives that may be used as viscosifying agents and surface active agents in fluids, subterranean treatments, and oilfield operations.

Viscosified treatment fluids may be used in a variety of subterranean treatments and oilfield operations. As used herein, the term "treatment," or "treating," refers to any subterranean operation that uses a fluid in conjunction with a desired function and/or for a desired purpose. The term "treatment," or "treating," does not imply any particular action by the fluid. Examples of common subterranean treatments include, but are not limited to, drilling operations, pre-pad treatments, fracturing operations, perforation operations, preflush treatments, afterflush treatments, sand control treatments (e.g., gravel packing), acidizing treatments (e.g., matrix acidizing or fracture acidizing), diverting treatments, cementing treatments, and well bore clean-out treatments. For example, in certain fracturing treatments generally a treatment fluid (e.g., a fracturing fluid or a "pad fluid") is introduced into a well bore that penetrates a subterranean formation at a sufficient hydraulic pressure to create or enhance one or more pathways, or "fractures," in the subterranean formation. These cracks generally increase the permeability of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore penetrating the formation. Treatment fluids may also be used in a variety of pipeline treatments, either in subterranean pipelines or pipelines above ground.

Maintaining sufficient viscosity in treatment fluids may be important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport, as well as to create or enhance fracture width. Particulate transport is also important in sand control treatments, such as gravel packing. Maintaining sufficient viscosity may be important to control and/or reduce leak-off into the formation, improve the ability to divert another fluid in the formation, and/or reduce pumping requirements by reducing friction in the well bore. At the same time, while maintaining sufficient viscosity of a treatment fluid often is desirable, it also may be desirable to maintain the viscosity of the treatment fluid in such a way that the viscosity may be reduced at a particular time, inter alia, for subsequent recovery of the fluid from the formation. To provide the desired viscosity, polymeric viscosifying agents commonly are added to the treatment fluids. The term "viscosifying agent" is defined herein to include any substance that is capable of increasing the viscosity of a fluid, for example, by forming a gel. Examples of commonly used polymeric viscosifying agents include, but are not limited to guar gums and derivatives thereof, cellulose derivatives, biopolymers, and the like.

In many of the aforementioned subterranean treatments, surfactants also may be included in a treatment fluid, among other reasons, to impart certain surface active properties to the fluid. Such surfactants may be used as an emulsifying agent, a de-emulsifying agent, a foaming agent, a defoaming agent, a viscosifying agent, a dispersant, a wetting agent, and the like. Surfactants also may be used to enhance the removal of heavy oil from mineral surfaces in a subterranean formation and/or well bore.

In treatments where both viscosifying agents and surfactants are desired to treat the same portion of a subterranean formation or well bore, current methods generally involve pumping multiple additives into the formation, either in the same treatment fluid or in several different treatment fluids. However, if the desired surfactant is incompatible with the desired viscosifying agent and/or another additive, it may be difficult or impossible to pump these additives into the formation or the well bore at the same time. Pumping these different additives sequentially may increase the amount of time needed to treat the formation and/or complicate the design of the treatment process. Moreover, if a surfactant is pumped into a well too early, the concentration of the surfactant may decrease before the treatment can be completed (due to degradation, fluid loss, and/or other factors), resulting in ineffective or incomplete treatment.

BRIEF DESCRIPTION OF THE FIGURES

Some specific example embodiments of the disclosure may be understood by referring, in part, to the following description and the accompanying drawings.

FIG. 3 is a diagram showing the chemical structure of a surface active fragment formed from certain embodiments of a dual-purpose additive of the present disclosure.

Figure 1:
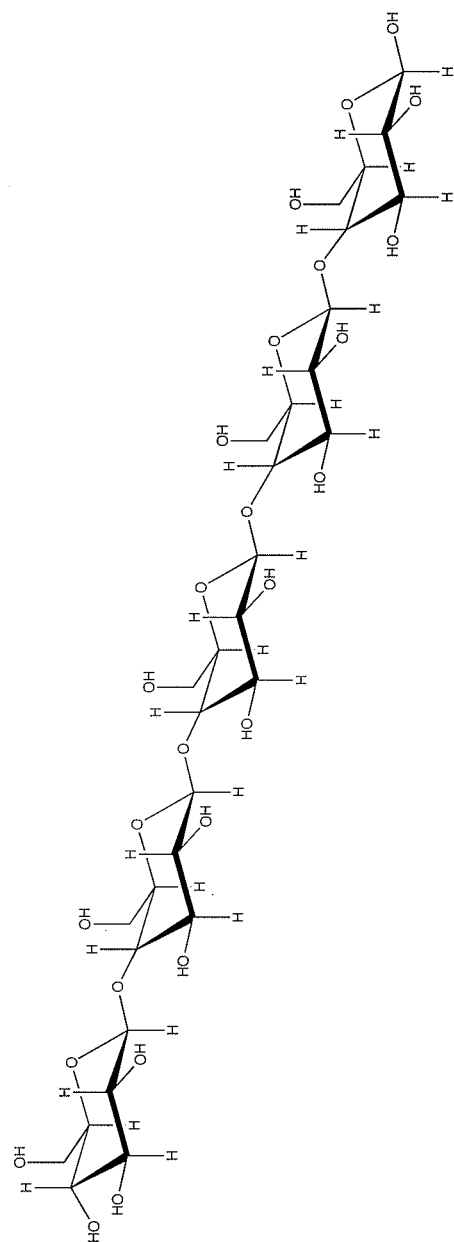
FIG. 1 is a diagram showing the chemical structure of a portion of a cellulose molecule that may be used to form certain embodiments of a dual-purpose additive of the present disclosure.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed. On the contrary, this disclosure is to cover all modifications and equivalents as illustrated, in part, by the appended claims.

DETAILED DESCRIPTION

The present disclosure relates to fluids, additives, and methods for use in subterranean treatments, and more specifically, to dual-purpose additives that may be used as viscosifying agents and surface active agents in fluids, subterranean treatments, and oilfield operations.

The dual-purpose additives of the present disclosure generally comprise a hydrophobically-modified polymer that comprises a base polymer having a plurality of monomer units and one or more hydrophobic groups bonded to at least one of the monomer units. With the base polymer intact, the dual-purpose additive may act as a viscosifying agent in a fluid (e.g., a water-based treatment fluid). In certain embodiments, the dual purpose additives of the present disclosure may be depolymerized (e.g., by reaction with a chemical breaker or some other depolymerization process), breaking down the molecules of that additive into shorter chain surface active fragments (e.g., oligomers, trimers, dimers, and/or monomers) that each comprise one or more of the hydrophobic groups bonded to one or more of the monomer units. These shorter chain surface active fragments may impart one or more surface active properties to a fluid (e.g., a water-based treatment fluid).

Among the many potential advantages of the present disclosure, the methods and dual-purpose additives of the present disclosure may, among other things, enhance the efficiency and effectiveness of numerous subterranean treatments and/or oilfield operations in a number of ways. The dual functionality of the additives of the present disclosure may make multi-stage treatments simpler to implement, and may reduce the number of different additives and fluids that must be stored at a well site and/or pumped into a well bore. Moreover, because the depolymerized portions of the dual-purpose additives of the present disclosure may be used as surface active agents after they are used as a viscosifying agent and broken, well bore clean-up operations following treatments using a viscosified fluid may be simplified. In certain embodiments, the surface active fragments formed using dual-purpose additives of the present disclosure may be customized for a particular application by controlling the size of the hydrophobic groups. In certain embodiments, the surface active fragments produced using the dual-purpose additives of the present disclosure also may pose fewer environmental and/or safety risks than other types of surface active agents used in the field. In certain embodiments, the dual-purpose additives of the present disclosure also may provide an alternative mechanism of crosslinking molecules of the additive while being used as a polymeric viscosifying agent, for example, through van der Waals interactions between the hydrophobic groups on different molecules of the additive. Such crosslinking may impart enhanced rheological properties (e.g., viscosity) to the fluids in which these additives are used.

In certain embodiments, the methods and dual-purpose additives of the present disclosure may provide a way to introduce a fluid comprising a surface active agent into a subterranean formation in a "dormant" state (i.e., while the dual-purpose additive is still in its polymeric form) with a delay before the dual-purpose additive is depolymerized and the surface active fragments are formed. In certain embodiments, the methods and dual-purpose additives of the present disclosure may permit the use of contrasting and/or incompatible surface active agents (including surface active agents that are incompatible with other components of a treatment fluid) at different stages of a given treatment. In one embodiment of the present disclosure, a fluid comprising a first surface active agent (e.g., a de-emulsifying surfactant) and dual-purpose additive of the present disclosure may be introduced into a subterranean formation initially. Once the stage of the treatment involving the first surface active agent has been completed, the dual-purpose additive may be depolymerized to produce a second surface active agent in the form of surface active fragments that may be incompatible with the first surface active agent and/or impart different surface active properties to the fluid (e.g., an emulsifying surfactant). In these embodiments, because the surface active fragments are not present until the dual-purpose additive is depolymerized, the incompatibility or counteractivity of these surface active agents may be avoided. A person of skill in the art with the benefit of this disclosure will recognize the incompatibility of the surface active agents used and/or formed in a particular embodiment of the present disclosure, and will be able to apply the methods and compositions disclosed herein to account for those circumstances.

The dual purpose additives are generally formed by grafting hydrophobic groups onto a base polymer. The base polymer in the dual-purpose additives of the present disclosure may comprise any polymer known in the art that comprises a plurality of monomer units and is capable of increasing the viscosity of a fluid. The base polymer may comprise naturally-occurring polymers, synthetic polymers, and combinations thereof. In certain embodiments, suitable base polymers may comprise polysaccharides, biopolymers, and/or derivatives thereof that contain one or more monosaccharide units, including but not limited to allose, altrose, arabinose, eibose, fructose, galactose, gulose, glucose, iodose, lyxose, mannose, ribose, talose, xylose, and the like. In certain embodiments, the base polymer may comprise one or more complex sugars (e.g., disaccharides, trisaccharides, etc.), including but not limited to sucrose, lactose, maltose, and the like. In certain embodiments, the base polymer may comprise sugar derivatives, such as amino sugars (e.g., glucosamines) and/or other saccharide derivatives. The term "derivative," as used herein, includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. Examples of suitable polysaccharides include, but are not limited to, natural gums (e.g., gum arabic, gum ghatti, gum karaya, tamarind gum, locust bean gum, etc.), guar gums (e.g., hydroxyethyl guar, hydroxypropyl guar, carboxymethyl guar, carboxymethylhydroxyethyl guar, and carboxymethylhydroxypropyl guar ("CMHPG")), welan gums, cellulose, cellulose derivatives (e.g., hydroxyethyl cellulose, carboxyethylcellulose, carboxymethylcellulose, and carboxymethylhydroxyethylcellulose), pectin, starches (e.g., amylopectin), glycans (e.g., chitin, chitosan, etc.), xanthan, scleroglucan, diutan, glycogen, derivatives thereof, and combinations thereof. In certain embodiments, the base polymer may comprise an organic carboxylated polymer, such as CMHPG. Examples of synthetic base polymers that may be suitable for use in the methods of the present disclosure include, but are not limited to, amide-based polymers (e.g., acrylamides), nitrile polymers, and the like.

The hydrophobic groups in the dual-purpose additives of the present disclosure may comprise any hydrophobic functional groups known in the art. Examples of hydrophobic groups that may be suitable for use in the present disclosure include, but are not limited to, alkyl groups, aryl groups, aromatic groups, alkene groups, amine groups, hydrophobic derivatives thereof, and combinations thereof. In certain embodiments, the length of the carbon chain in these hydrophobic groups may be from about 4 carbon atoms (C4) to about 28 carbon atoms (C28). Any number of hydrophobic groups, as long as the dual-purpose additive is still soluble in water. In certain embodiments, at least one hydrophobic group may be attached to up to 50% of the monomer units in the dual-purpose additive of the present disclosure. In certain embodiments, at least one hydrophobic group may be attached to 10% of the monomer units in the dual-purpose additive of the present disclosure.

The surface active fragments formed from the dual-purpose additives of the present disclosure may impart one or more surface active properties to a fluid and/or act as a co-surfactant in conjunction with other surface active agents in the fluid. Such surface active fragments may act as, for example, an emulsifying agent, a de-emulsifying agent, a foaming agent, a defoaming agent, a viscosifying agent, a dispersant, a wetting agent, or the like. One type of surface active fragments that may be formed from the dual-purpose additives of the present disclosure are sugar-headed fragments (e.g., glycosides, maltosides, sucrosides, galactosides, fructosides, ribosides, rhamnosides, glucuronides, mannosides, etc.) that include a monosaccharide or oligomeric saccharide "head" and a hydrophobic "tail" comprising the hydrophobic group. Other types of surface active fragments that may be formed from the dual-purpose additives of the present disclosure include, but are not limited to, acrylamide surface active fragments, amide surface active fragments, and the like. The particular surface active fragment(s) formed will depend upon, among other things, the hydrophobic groups and the base polymer used in forming the polymeric dual-purpose additive, the number of hydrophobic functional groups bonded to the base polymer, the degree of depolymerization of the dual purpose additive, and/or other factors. For example, in certain embodiments, if a dual purpose additive of the present disclosure is completely depolymerized, it may form only surface active fragments comprising monomeric "heads". In other embodiments, if the dual purpose additive is not completely depolymerized, it may form a mixture of surface active fragments, some of which may comprise monomeric "heads" while others may comprise oligomeric "heads".

Figure 4A:
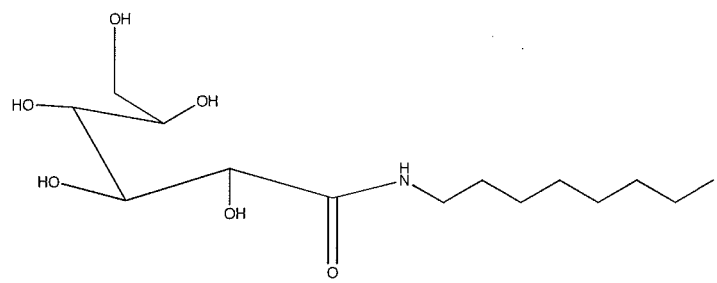
FIGS. 4A, 4B, and 4C are diagrams showing the chemical structure of certain surface active fragments that may be formed from certain embodiments of a dual-purpose additive of the present disclosure.
Figure 4B:
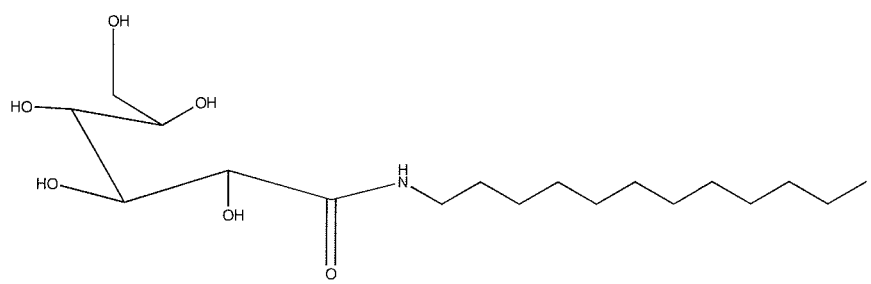
Figure 4C:
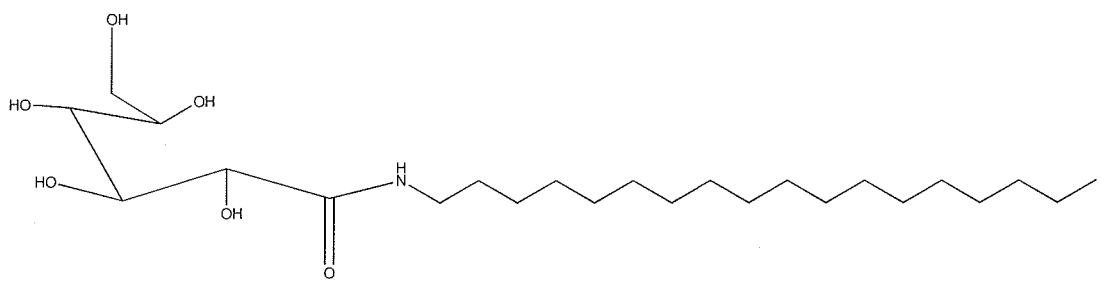

As a person of skill in the art with the benefit of this disclosure will recognize, the hydrophilic lipophilic balance (HLB) of the surface active fragments formed from a dual-purpose additive may indicate the types of surface active properties that the fragment will likely exhibit. The HLB of the surface active fragments formed from a dual-purpose additive of the present disclosure may be anywhere in the possible range of HLB values (e.g., from 0 to 30). In certain embodiments, the HLB of the surface active fragments produced from a dual-purpose additive of the present disclosure may be controlled (at least within a preselected range based on a predetermined application) by selecting hydrophobic groups having carbon chains of a certain length to form the dual-purpose additive. For example, it may be possible to obtain sugar-based surface active fragments having an HLB from about 6 to about 14 using hydrophobic groups of various carbon chain lengths. In certain embodiments, sugar-based surface active fragments having hydrophobic groups with longer carbon chains may exhibit lower HLB values. For example, the gluconamide surface active fragments shown in FIGS. 4A, 4B, and 4C have otherwise similar structures except that the length of the hydrophobic carbon chains in their amine groups varies (8, 12, and 18 carbon atoms, respectively). The corresponding HLB values for those surface active fragments (as calculated using Griffin's method) are 11.7, 9.9, and 8.0, respectively. The HLB of the surface active fragments formed from a dual-purpose additive also may be affected or controlled by the size of the "head" group of the fragment (e.g., whether it is monomeric or oligomeric), which may depend upon, among other things, the degree to which the dual-purpose additive was depolymerized. A person of skill in the art with the benefit of this disclosure will be able to select hydrophobic groups to include in a dual-purpose additive of the present disclosure that can be used to form surface active fragments having the desired HLB.

Figure 2:
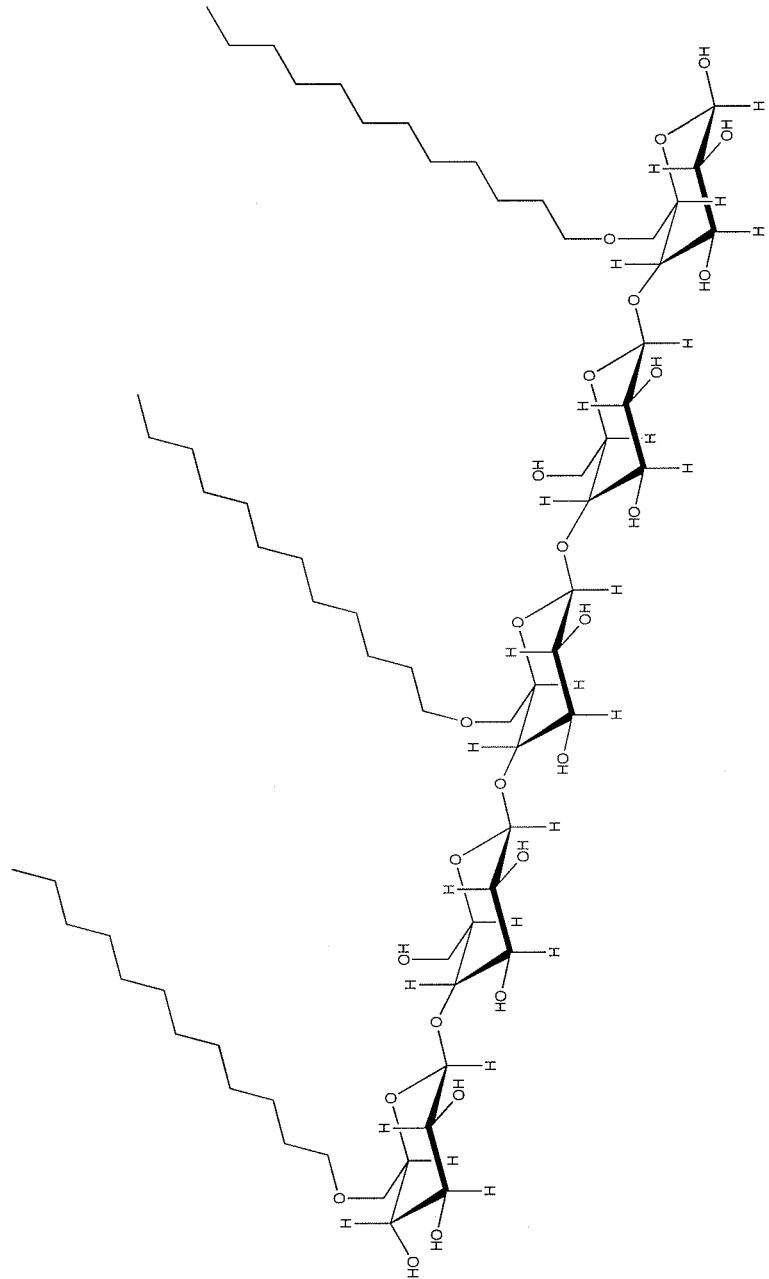
FIG. 2 is a diagram showing the chemical structure of a portion of one embodiment of a dual-purpose additive of the present disclosure.

A 5-unit repeating section of an example of a dual-purpose additive of the present disclosure is illustrated in FIG. 2. The molecules of this dual-purpose additive comprise a cellulose base polymer (which is illustrated in FIG. 1 in its unmodified form) that has been modified to include a plurality of dodecyl hydrophobic groups grafted onto the polymer backbone. In this form, the dual-purpose additive may act as a viscosifying agent in a water-based treatment fluid. Depolymerization of the dual-purpose additive shown in FIG. 2 may produce, among other things, a dodecyl glucoside surface active fragment as shown in FIG. 3. This surface active fragment may impart one or more surface active properties to a water-based treatment fluid.

The dual-purpose additives of the present disclosure may be produced by grafting hydrophobic monomers onto a base polymer. Such grafting may be performed by any mechanism or reaction known in the art, including but not limited to direct alkylation and esterification with a fatty acid. In certain embodiments, alkyl hydrophobic groups may be grafted onto the base polymer in two steps. In the first step, alkyl ethers of the polymer are prepared. In the second step, the alkyl ether of the base polymer is reacted with a long aliphatic chain epoxy compound such that the hydrophobic group becomes bonded to the polymer molecule. The procedures and conditions used for these steps are well known to those skilled in the art. Hydrophobically modified polymers that may be suitable for use in certain embodiments of the dual-purpose additives of the present disclosure may be commercially available from Rhodia, Inc. of Cranberry, N.J.

In those embodiments of the present invention where it is desirable to crosslink the dual-purpose additive (e.g., crosslinking to a greater degree than any crosslinking performed by the hydrophobic groups), one or more of the crosslinking agents optionally may be included or added into the fluid. Suitable crosslinking agents may comprise a borate, a metal ion, or similar component that is capable of crosslinking at least two molecules of the dual-purpose additive. Examples of suitable crosslinking agents include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.)

and/or interaction with some other substance. In some embodiments, the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of dual-purpose additive included, the molecular weight of the dual-purpose additive, the conditions where the fluid will be used, the safety handling requirements, the pH of the fluid, temperature, and/or the desired delay for the crosslinking agent to crosslink the dual-purpose additive molecules.

When included, suitable crosslinking agents may be present in the fluid in an amount sufficient to provide, inter alia, the desired degree of crosslinking between molecules of the dual-purpose additive. In certain embodiments, the crosslinking agent may be present in the fluid in an amount in the range of from about 0.0005% to about 1% by weight of the fluid. In certain embodiments, the crosslinking agent may be present in the fluids in an amount in the range of from about 0.005% to about 1% by weight of the fluid. One of ordinary skill in the art, with the benefit of this disclosure, will recognize the appropriate amount of crosslinking agent to include in a fluid based on, among other things, the temperature conditions of a particular application, the type of dual-purpose additive used, the molecular weight of the dual-purpose additive, the desired degree of viscosification, and/or the pH of the fluid.

The additives of the present disclosure may be used in conjunction with any fluid, which may include, but are not limited to, treatment fluids introduced into a subterranean formation as well as fluids found in a subterranean formation (e.g., formation water, hydrocarbon fluids, etc.) and/or any combination thereof. The fluids in the present disclosure generally comprise a base fluid, which may comprise any liquid known in the art, such as aqueous fluids, non-aqueous fluids, or any mixture thereof. Where the base liquid comprises an aqueous liquid, it may comprise fresh water, salt water (e.g., water containing one or more salts dissolved therein), brine (e.g., saturated salt water), or seawater. Generally, the water can be from any source, provided that it does not contain compounds that adversely affect other components of the fluid. In certain embodiments, the fluids in the present disclosure may comprise emulsions (including invert emulsions), suspensions, gels, foams, or other mixtures of liquids with solids and/or gases.

The dual-purpose additive may be present in or added to a fluid of the present disclosure in an amount sufficient to provide the desired viscosity. In certain embodiments, an appropriate amount of the dual-purpose additive may correspond to the appropriate amount of a conventional viscosifying agent sharing the same base polymer as the dual-purpose additive, which a person of skill in the art will recognize with the benefit of this disclosure. In some embodiments, the dual-purpose additive (i.e., in its polymeric form) may be present in an amount in the range of from about 0.1% to about 10% by weight of the fluid. In certain embodiments, the dual-purpose additive may be present in an amount in the range of from about 0.15% to about 2.5% by weight of the fluid.

The fluids used in the present disclosure optionally may comprise any number of additional additives suitable for the particular application. In certain embodiments, a fluid comprising a dual-purpose additive of the present disclosure may further comprise one or more additional surface active agents (i.e., a surface active agent in addition to the surface active fragments formed via the depolymerization of the dual-purpose additive) and/or co-surfactants. In other embodiments, a fluid comprising a dual-purpose additive of the present disclosure may be substantially free of surface active agents and/or co-surfactants prior to depolymerization of the dual-purpose additive. Examples of other additional additives that may be used include, but are not limited to, salts, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, additional viscosifiers and/or gelling agents, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the fluids of the present disclosure for a particular application.

Any method of at least partially depolymerizing the polymeric backbone of the dual-purpose additives (e.g., breaking the acetal linkages between the monomer units that make up the polymer) may be used in accordance with the present disclosure. In certain embodiments, one or more chemical breakers may interact with the dual purpose additives to depolymerize the polymeric backbone. Such chemical breakers may be incorporated into a treatment fluid when it is provided for use and/or may be added to the treatment fluid at some point thereafter. In certain embodiments, delayed breakers or encapsulated breakers that will react with the treatment fluids after desired delay periods may be used. In other embodiments, the polymeric backbone may be depolymerized by exposure to certain conditions, such as heat, increased pressure, radiation, or the like.

Examples of suitable chemical breakers include, but are not limited to, acids, enzyme breakers (e.g., alpha and beta amylases, amyloglucosidase, invertase, maltase, cellulase, and hemicellulase), and oxidizing agents (e.g., sodium chlorite, sodium bromate, sodium persulfate, ammonium persulfate, and magnesium peroxide. Other breakers that may be suitable for use with the methods and additives of the present disclosure include alkali metal carbonates, alkali metal bicarbonates, alkali metal acetates, other alkaline earth metal oxides, alkali metal hydroxides, amines, weak acids and the like. Suitable delayed breakers may comprise materials that are slowly soluble in a treatment fluid. An example of a suitable delayed gel breaker is commercially available under the trade name "VICON NF™," available from Halliburton Energy Services, Inc., Duncan, Okla. Examples of suitable encapsulated gel breakers are described in U.S. Pat. Nos. 5,373,901; 5,604,186; and 6,357,527. The appropriate breaker and amount thereof may depend upon the formation characteristics and conditions, the particular dual-purpose additive chosen, the pH of the treatment fluid, whether complete or partial depolymerization of the dual-purpose additive is desired, and other factors known to individuals skilled in the art, with the benefit of this disclosure. In certain embodiments, the amount of a chemical breaker included may be based at least in part of the amount of surface active fragments desired in the fluid after the breaker has completely reacted with the dual-purpose additive. For example, if higher concentrations of surface active fragments are desired, more breaker may be used in order to more completely depolymerize the dual-purpose additive. In certain embodiments wherein the breaker comprises an enzyme breaker, the enzyme breaker may be included in a treatment fluid of the present invention in an amount of from about 0.001% to about 5% by weight of the dual-purpose additive therein. In certain embodiments wherein the breaker comprises an enzyme breaker, the enzyme breaker may be included in a treatment fluid of the present invention in an amount of from about 0.1% to about 10% by weight of the dual-purpose additive therein. In certain embodiments wherein the breaker comprises an oxidizing agent, the oxidizing agent may be included in a treatment fluid of the present invention in an amount of from about 0.1% to about 10% by weight of the dual-purpose additive therein. In certain embodiments wherein the breaker comprises an oxidizing agent, the oxidizing agent may be included in a treatment fluid of the present invention in an amount of from about 0.01% to about 10% by weight of the dual-purpose additive therein.

The methods, fluids, and/or dual-purpose additives of the present disclosure may be used during or in conjunction with any subterranean operation wherein a fluid is used or treated. In certain embodiments, the methods, fluids, and/or additives of the present disclosure may be used in the course of drilling operations. Other suitable subterranean operations may include, but are not limited to, preflush treatments, afterflush treatments, hydraulic fracturing treatments, sand control treatments (e.g., gravel packing), acidizing treatments (e.g., matrix acidizing or fracture acidizing), "frac-pack" treatments, well bore clean-out treatments, and other operations where a treatment fluid may be useful. Such treatment fluids may include, but are not limited to, drilling fluids, preflush fluids, afterflush fluids, fracturing fluids, acidizing fluids, gravel packing fluids, packer fluids, cleaning fluids, spacer fluids, and the like.

In certain embodiments, the methods, fluids, and/or dual-purpose additives of the present disclosure also may be used to facilitate the recovery of oil, water, or other fluids residing in a subterranean formation (herein referred to as "subterranean fluids") out of the formation, or to facilitate transport of oil, water, or other fluids that were produced previously from a subterranean formation (herein referred to as "produced fluids") from one location to a second location that is remote from the well site, for example, through a pipeline. For example, in certain embodiments, the dual-purpose additives of the present disclosure may be added to a subterranean fluid or a produced fluid, which, either immediately or after further treatments, may convert the subterranean fluid or produced fluid to another form (e.g., an emulsified, foamed, or viscosified fluid) that is more easily transported out of the subterranean formation and/or through a pipeline to another location.

In one embodiment, the present disclosure provides a method comprising:

providing a treatment fluid comprising a base fluid and a polymeric dual-purpose additive comprising a base polymer comprising a plurality of monomer units, and one or more hydrophobic groups bonded to at least one of the monomer units; introducing the treatment fluid into at least a portion of a subterranean formation; and depolymerizing at least a portion of the dual-purpose additive to form one or more surface active fragments, each of the surface active fragments comprising one or more of the hydrophobic groups bonded to one or more of the monomer units.

In another embodiment, the present disclosure provides a method comprising: (a) providing a treatment fluid comprising a base fluid, a surface active agent, and a polymeric dual-purpose additive comprising a base polymer comprising a plurality of monomer units, and one or more hydrophobic groups bonded to at least one of the monomer units; (b) introducing the treatment fluid into at least a portion of a subterranean formation; (c) performing at least a portion of a subterranean treatment using the treatment fluid; and (d) after step (c), depolymerizing at least a portion of the dual-purpose additive to form one or more surface active fragments, each of the surface active fragments comprising one or more of the hydrophobic groups bonded to one or more of the monomer units.

In another embodiment, the present disclosure provides a method comprising: providing a produced fluid that has been produced from a portion of a subterranean formation; adding a polymeric dual-purpose additive to the produced fluid, the polymeric dual-purpose additive comprising a base polymer comprising a plurality of monomer units, and one or more hydrophobic groups bonded to at least one of the monomer units; transporting at least a portion of the produced fluid comprising at least a portion of the polymeric dual-purpose additive from a well site to another location; during the step of transporting at least a portion of the produced fluid, depolymerizing at least a portion of the dual-purpose additive to form one or more surface active fragments, each of the surface active fragments comprising one or more of the hydrophobic groups bonded to one or more of the monomer units.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A method comprising:
    providing a treatment fluid comprising a base fluid and a polymeric dual-purpose additive comprising
        a base polymer comprising a plurality of monomer units, and one or more hydrophobic groups bonded to at least one of the monomer units;

introducing the treatment fluid into at least a portion of a subterranean formation; and depolymerizing at least a portion of the dual-purpose additive to form one or more surface active fragments, each of the surface active fragments comprising one or more of the hydrophobic groups bonded to one or more of the monomer units.

2. The method of claim 1 further comprising allowing the dual-purpose additive to increase the viscosity of the treatment fluid prior to the step of depolymerizing at least a portion of the dual-purpose additive.

3. The method of claim 1 wherein the base fluid comprises an aqueous fluid.

4. The method of claim 1 wherein the hydrophilic lipophilic balance of the surface active fragments is from about 6 to about 14.

5. The method of claim 1 wherein the base polymer comprises one or more polysaccharides.

6. The method of claim 1 wherein the base polymer comprises at least one polymer selected from the group consisting of: a guar gum, a cellulose, a starch, a biopolymer, a synthetic polymer, an amino sugar, any derivative thereof, and any combination thereof.

7. The method of claim 1 wherein the surface active fragments comprise one or more oligomeric saccharides.

8. The method of claim 1 wherein the one or more hydrophobic groups comprise at least one hydrophobic group selected from the group consisting of: an alkyl group, an aryl group, an aromatic group, an alkene group, any derivative thereof, and any combination thereof.

9. The method of claim 1 wherein the one or more hydrophobic groups comprise a chain of carbon atoms from about 4 carbon atoms to about 28 carbon atoms in length.

10. The method of claim 1 wherein the one or more hydrophobic groups are selected to produce surface active fragments having a hydrophilic lipophilic balance in a preselected range.

11. The method of claim 1 wherein the step of depolymerizing at least a portion of the dual-purpose additive comprises allowing one or more chemical breakers to interact with at least a portion of the dual-purpose additive.

12. The method of claim 1 wherein the treatment fluid further comprises one or more delayed breakers.

13. The method of claim 1 wherein the treatment fluid further comprises one or more crosslinking agents.

14. A method comprising:
(a) providing a treatment fluid comprising a base fluid, a surface active agent, and a polymeric dual-purpose additive comprising
a base polymer comprising a plurality of monomer units, and
one or more hydrophobic groups bonded to at least one of the monomer units;
(b) introducing the treatment fluid into at least a portion of a subterranean formation;
(c) performing at least a portion of a subterranean treatment using the treatment fluid; and
(d) after step (c), depolymerizing at least a portion of the dual-purpose additive to form one or more surface active fragments, each of the surface active fragments comprising one or more of the hydrophobic groups bonded to one or more of the monomer units.

15. The method of claim 14 wherein the surface active fragments impart surface active properties to the fluid different than surface active properties imparted to the fluid by the surface active agent.

16. The method of claim 15 wherein the surface active agent comprises an emulsifying surface active agent and the surface active fragments comprise de-emulsifying surface active fragments.

17. The method of claim 15 wherein the surface active agent comprises a de-emulsifying surface active agent and the surface active fragments comprise emulsifying surface active fragments.

18. A method comprising:
providing a produced fluid that has been produced from a portion of a subterranean formation;
adding a polymeric dual-purpose additive to the produced fluid, the polymeric dual-purpose additive comprising
a base polymer comprising a plurality of monomer units, and
one or more hydrophobic groups bonded to at least one of the monomer units;
transporting at least a portion of the produced fluid comprising at least a portion of the polymeric dual-purpose additive from a well site to another location;
during the step of transporting at least a portion of the produced fluid, depolymerizing at least a portion of the dual-purpose additive to form one or more surface active fragments, each of the surface active fragments comprising one or more of the hydrophobic groups bonded to one or more of the monomer units.

19. The method of claim 18 wherein at least a portion of the produced fluid is transported from a well site to another location through a pipeline.

20. The method of claim 18 comprising allowing the dual-purpose additive to increase the viscosity of the produced fluid prior to the step of depolymerizing at least a portion of the dual-purpose additive.

* * * * *